US007796865B2

(12) United States Patent
Park

(10) Patent No.: US 7,796,865 B2
(45) Date of Patent: Sep. 14, 2010

(54) METHOD AND APPARATUS FOR MANAGING INFORMATION FOR EDITING RECORDED DATA

(75) Inventor: Sung Wan Park, Suwon-si (KR)

(73) Assignee: LG Electronics, Inc., Seoul (KR)

( * ) Notice: Subject to any disclaimer, the term of this patent is extended or adjusted under 35 U.S.C. 154(b) by 1283 days.

(21) Appl. No.: 11/329,172

(22) Filed: Jan. 11, 2006

(65) Prior Publication Data

US 2006/0171048 A1 Aug. 3, 2006

Related U.S. Application Data

(60) Provisional application No. 60/643,119, filed on Jan. 12, 2005.

(30) Foreign Application Priority Data

Apr. 4, 2005 (KR) .............. 10-2005-0028027

(51) Int. Cl.
 H04N 5/00 (2006.01)
 H04N 5/93 (2006.01)
 H04N 5/91 (2006.01)
 H04N 7/00 (2006.01)
(52) U.S. Cl. .............. 386/125; 386/52; 386/55; 386/46; 386/68; 386/95; 386/126
(58) Field of Classification Search ............... 386/46, 386/95, 125–126, 68, 52, 55
See application file for complete search history.

(56) References Cited

U.S. PATENT DOCUMENTS

| 5,566,174 | A | * | 10/1996 | Sato et al. | 370/468 |
|---|---|---|---|---|---|
| 6,771,724 | B2 | | 8/2004 | Yoo et al. | |
| 6,789,072 | B1 | | 9/2004 | Kim et al. | |
| 7,197,233 | B1 | * | 3/2007 | Winter et al. | 386/95 |
| 2004/0018002 | A1 | * | 1/2004 | Kato et al. | 386/94 |

OTHER PUBLICATIONS

International Search Report for PCT/KR2005/003994 dated Feb. 27, 2006.

* cited by examiner

Primary Examiner—Thai Tran
Assistant Examiner—Daquan Zhao
(74) Attorney, Agent, or Firm—Harness, Dickey & Pierce, P.L.C.

(57) ABSTRACT

The present invention relates to editing data streams recorded in a recording medium. At the time of deleting an arbitrary navigation unit from a data stream partitioned by the navigation units and recorded in a recording medium, information is recorded in the recording medium, which, in a recording block including both remaining data belonging to the deleted navigation unit and valid data belonging to the navigation unit right before the deleted navigation unit, the information is used for distinguishing the valid data from the remaining data. By referring to the information afterwards, the remaining data can be prevented from being decoded.

14 Claims, 8 Drawing Sheets

FIG. 4

| b31 | b30 | b29 | b28 | b27 | b26 | b25 | b24 |
|-----|-----|-----|-----|-----|-----|-----|-----|
| 1STREF_SZ | | | | | | | SOBU_PB_TM (Upper) |

| b23 | b22 | b21 | b20 | b19 | b18 | b17 | b16 |
|-----|-----|-----|-----|-----|-----|-----|-----|
| SOBU_PB_TM (Lower) | | | | | | | SOBU_SZ (Upper) |

| b15 | b14 | b13 | b12 | b11 | b10 | b9 | b8 |
|-----|-----|-----|-----|-----|-----|-----|-----|
| SOBU_SZ (Lower) | | | | | | | |

| b7 | b6 | b5 | b4 | b3 | b2 | b1 | b0 |
|----|----|----|----|----|----|----|----|
| SOBU_S_PKT_POS | | | | | | | |

FIG. 8

| RBP | Field Name | Comments | Number of bytes |
|---|---|---|---|
| 4 | PKT_GRP_TY | Type of Packet Group | 1 byte |
| 5 | VERSION | Version of Packet Group | 1 byte |
| 6 | reserved | reserved | 1 byte |
| 7 to 8 | PKT_GRP_SS | Status of Packet Group | 2 byte |
| 9 | reserved | reserved | 1 byte |
| 10 | VALID_PKT_Ns | Number of valid Packets | 1 byte |
| 11 to 12 | FIRST_PATS_EXT | Extended bytes of PATS of the first Packet | 2 byte |
| 13 to 19 | reserved | reserved | 7 byte | ation unit and the valid data belonging to the navigation unit right before the deleted navigation unit.

The present invention is further characterized in that information is recorded on a recording medium when an arbitrary navigation unit is deleted from a data stream partitioned by navigation units, the information being used for distinguishing valid data from remaining data in a recording block including both the remaining data belonging to the deleted navigation unit and the valid data belonging to the navigation unit right after the deleted navigation unit.

In one embodiment of the present invention, information for distinguishing the remaining data from valid data is recorded in the area of continuous segment information, which is management information allocated to a data stream recorded continuously.

In another embodiment of the present invention, information for distinguishing the remaining data from valid data is recorded in a recording block which includes both the remaining data and valid data.

Also, in one embodiment of the present invention, information for distinguishing the remaining data from valid data is the order of a transport packet which includes the last or first valid data within the recording block.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 4 illustrates the structure of a time map element allocated for each navigation unit;

FIG. 8 illustrates the structure of general information within header information allocated for each recording block of HD-DVD, wherein information for excluding unnecessary remaining data is recorded according to the embodiment of FIG. 7.

DETAILED DESCRIPTION OF THE PREFERRED EMBODIMENT

Figure 1:
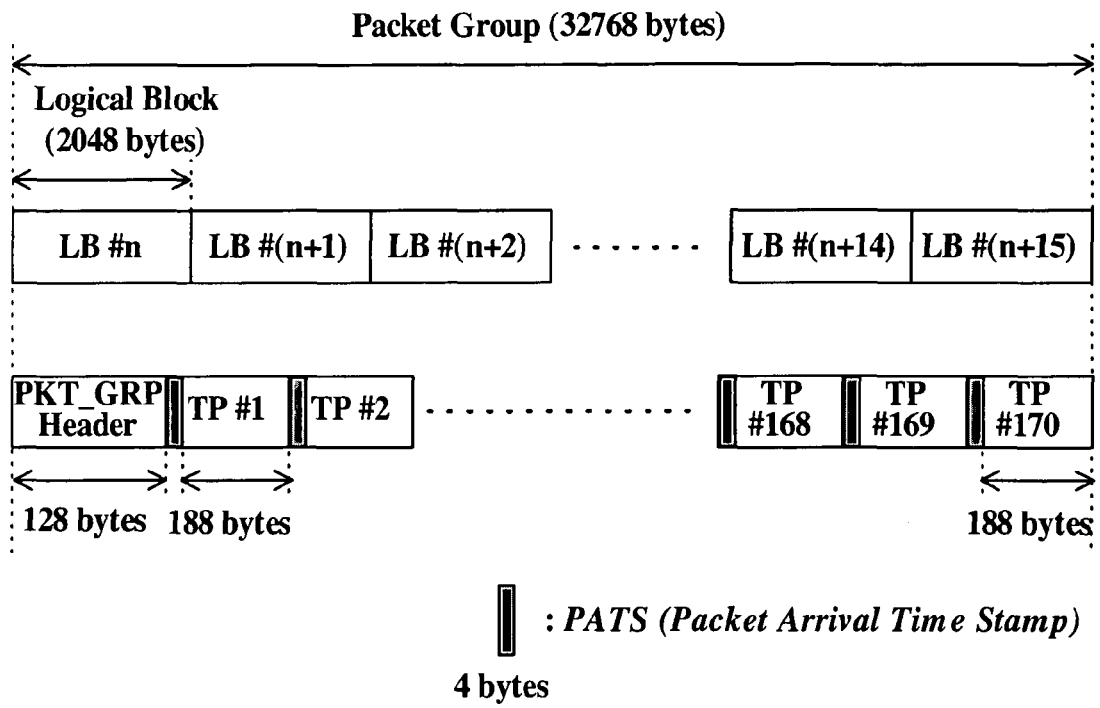
FIG. 1 illustrates the recording structure of a transport packet sequence in HD-DVD.

Hereinafter, according to the present invention, preferred embodiments will be described in detail with reference to appended drawings.

METHOD AND APPARATUS FOR MANAGING INFORMATION FOR EDITING RECORDED DATA

FOREIGN PRIORITY INFORMATION

This application claims priority from Korean Patent Application No. 10-2005-0028027, filed Apr. 4, 2005; the contents of which are hereby incorporated herein by reference in their entirety.

DOMESTIC PRIORITY INFORMATION

This application claims priority under 35 U.S.C. §119 on U.S. Provisional Application No. 60/643,119, filed Jan. 12, 2005; the entire contents of which are hereby incorporated by reference.

BACKGROUND

1. Field

This document relates to a method and an apparatus for managing information to edit video data recorded in a recording medium, particularly to process remaining data after deletion.

2. Description of the Related Art

As a medium to record video signals, an optical disc is replacing a magnetic tape. DVD+/-R is a typical rewritable optical disc medium; depending on recording mode, this disc can record video data for about one to six hours.

Currently, TV broadcast signal is being converted to digital form. Since TV broadcast signal in digital form provides superior video quality to current analog signal, a recording medium having larger recording capacity than DVD+/-R is necessary to record TV broadcast signal in digital form.

On these grounds, a rewritable disc of high capacity is being developed. Apart from such high capacity rewritable disc, when a data stream originating from digital broadcasting is recorded in a mid-capacity disc such as recent DVD+/-R, data stream being recorded is partitioned by navigation units for playback management; the navigation unit and a predetermined amount of data such as a recording block of a disc having the size of 32 kB do not align exactly with each other. Due to this misalignment, at the time of editing navigation units, special management information is needed so that subsequent playback of recorded data should be free from problems.

SUMMARY OF THE INVENTION

The present invention is directed to provide a method and an apparatus for generating and recording management information used to prevent unnecessary data, remaining from misalignment between navigation units and recording blocks during data deletion, from being decoded.

Another objective of the present invention is to provide a playback method and an apparatus for skipping data belonging to a deleted navigation unit by using the recorded management information.

The present invention to achieve the objectives above is characterized in that information is recorded on a recording medium when an arbitrary navigation unit is deleted from a data stream partitioned by navigation units, the information being used for distinguishing valid data from remaining data in a recording block including both the remaining data Before setting out description of the present invention, a method for recording digital data streams of HD-DVD proposed as a disc having higher capacity than DVD+/-R.

FIG. 1 illustrates the recording structure of a transport stream of HD-DVD. In the recording structure of FIG. 1, one packet group (recording block) has the size of 32,768 bytes which typically corresponds to the size of one block for encoding error correction code (ECC); therefore, data before ECC encoding can be obtained by reading a packet group and carrying out error correction process.

One packet group, that is to say, one recording block, includes 16 logical blocks. Typically, a logical block is a unit for reading and writing data at one time. Since the size of a packet group amounts to 32,768 bytes, as shown in FIG. 1, one packet group includes 170 MPEG transport packets (hereinafter, it is referred to as TP for short), each of which comprises 188 bytes, and packet group header of 128 bytes. Packet Arrival Time Stamp (PATS) comprising four bytes, where reception time of each TP is recorded, is added to the head of each TP before being recorded to HD-DVD, thereby completing one packet group.

Figure 2:
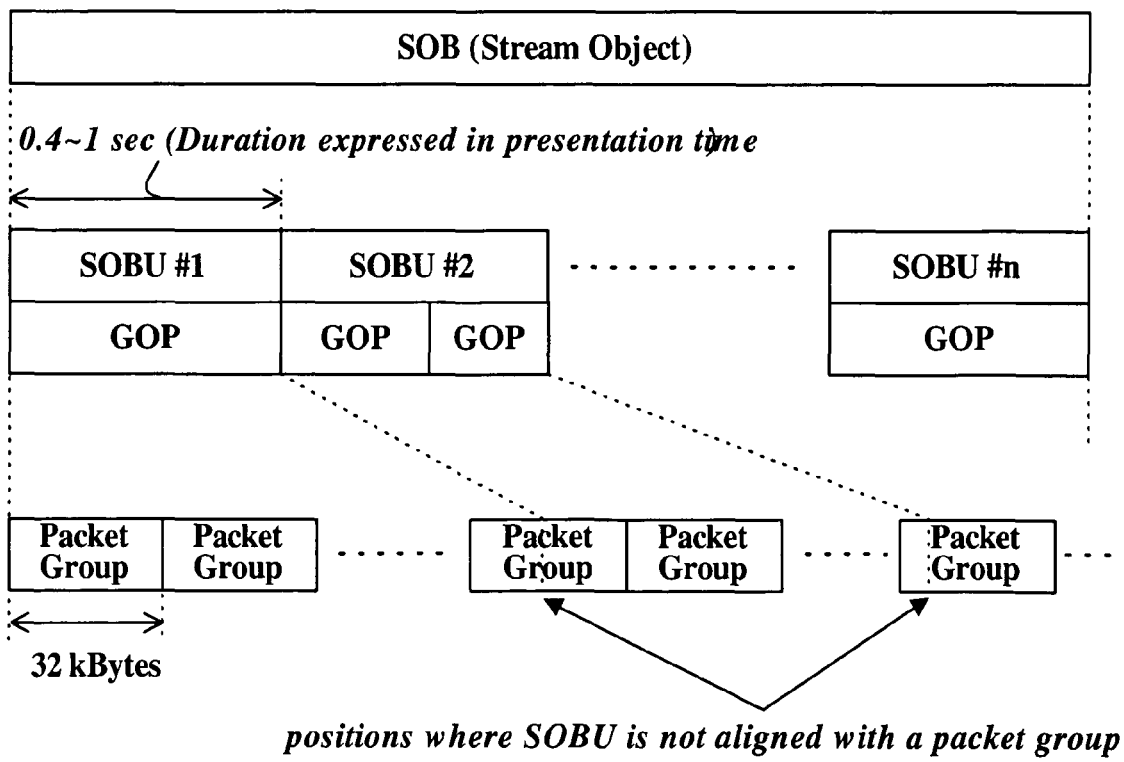
FIG. 2 illustrates relationship among navigation units and packet groups of recorded data in HD-DVD.

As shown in FIG. 2, when video content such as a TV program is recorded in HD-DVD, packet groups which amount to the corresponding size are created. Navigation information is created so as to access to the recorded video content; the navigation information manages the recorded video content as a single SOB (Stream Object) and includes information about navigation units in order to enable random access to the video content. As shown in FIG. 2, the navigation unit corresponds to a data block (which is called as SOBU (Stream Object Unit)) having presentation time length ranging 0.4-1 sec., where more than one GOP (Group Of Pictures) compliant with MPEG is included; when an SOB recorded in HD-DVD is searched for, its position is calculated in terms of SOBU units.

By the way, as can be noticed from the recording example of FIG. 2, since record data belonging to a single SOBU (hereinafter, they are referred to as SOBU) do not amount exactly to 31,960 bytes (which corresponds to the size after 170 PATS and 128 bytes of a packet group header have been subtracted from a single packet group), the start and/or end of SOBU is not aligned with packet groups.

Since each SOBU is composed of at least one complete GOP and GOP always has I-picture intracoded according to MPEG format at the head thereof, during trick play of recorded signals, it is advantageous for data decoding process to provide navigation information which distinguishes each SOBU interval only, thereby complementing misalignment. Therefore, management information for handling misalignment of each SOBU with packet groups is needed. Since the head I-picture within each SOBU is not aligned with a packet group, either, management information for handling misalignment of I-picture is needed, for example, in order to enhance decoding reliability during trick play.

Figure 3:
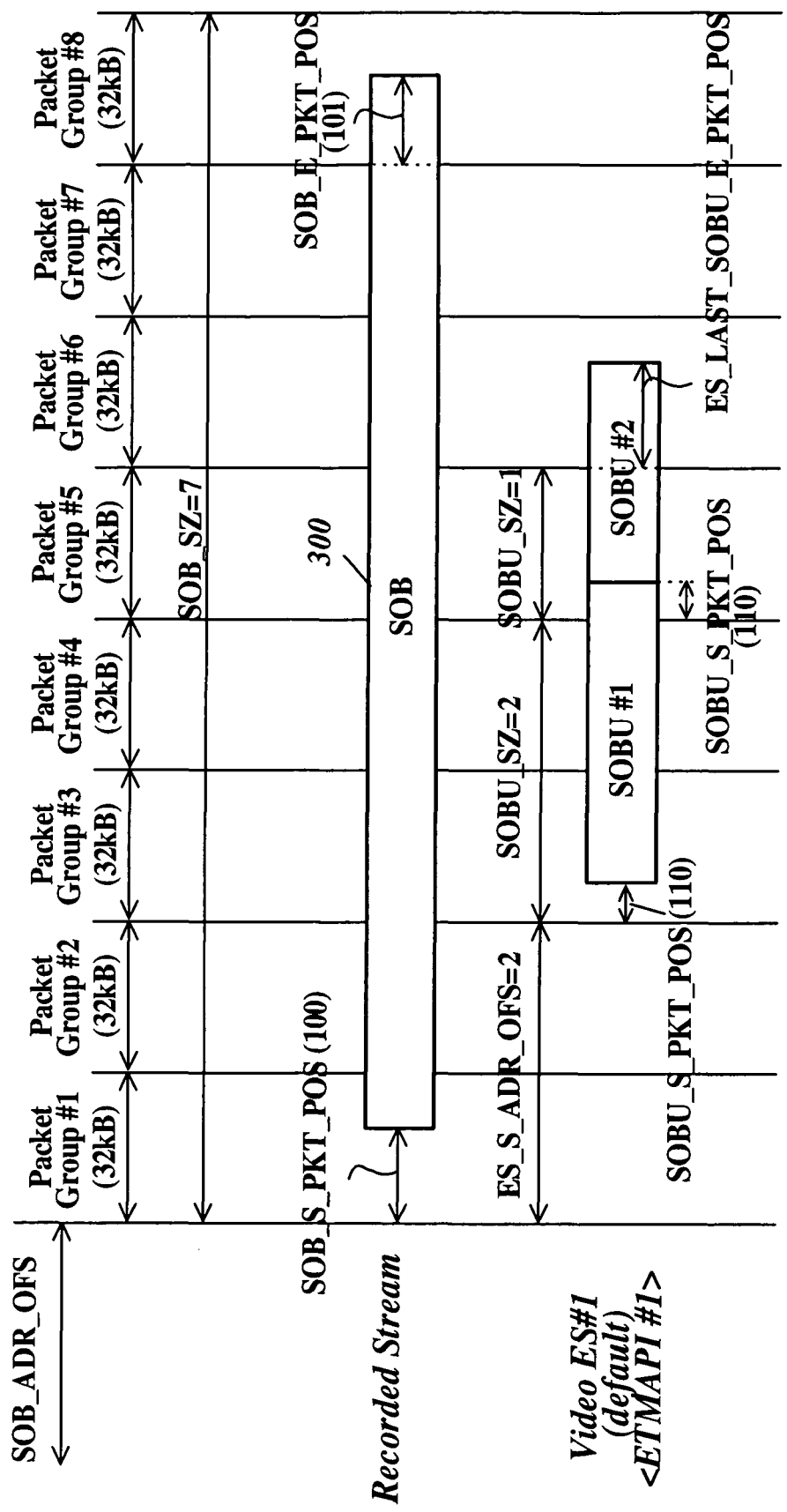
FIG. 3 illustrates exemplary information describing positional relationship among navigation units and packet groups of video data recorded in HD-DVD.

FIG. 3 shows an example of a data stream recorded in HD-DVD, for example, that of a digital TV program, where illustrated are information about misalignment between the recorded program 300 and recording blocks, namely, packet groups; and information about misalignment between each navigation unit of the program 300 and recording blocks. In FIG. 3, the recorded program 300 is recognized as a single SOB by navigation information; information about misalignment of the start and the end of the SOB 300 against recording blocks, namely, packet groups is recorded respectively in the fields of SOB_S_PKT_POS 100 and SOB_E_PKT_POS 101, which these fields are included in the management information of SOB. Information about misalignment of an SOBU belonging to the SOB, for example, SOBU #1 against packet groups is recorded in the field of SOBU_S_PKT_POS 110 of VOBU entry which is management information of SOBU #1. VOBU entry has the structure as shown in FIG. 4 and denotes elements of time map. The elements are called as VOBU entry since the elements are generated in accordance with one VOBU. By generating and recording management information about misalignment of a SOBU for each SOBU, misaligned interval of each SOBU is precisely described.

Figure 5:
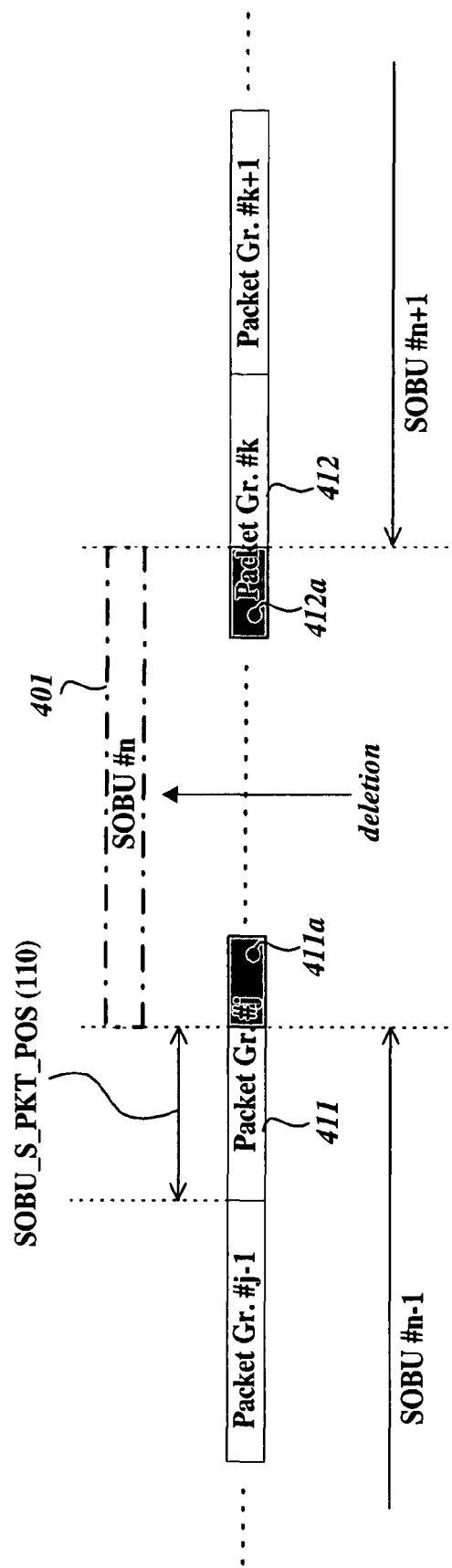
FIG. 5 illustrates a situation wherein unnecessary data are remained at the time of deleting a navigation unit.

By the way, a recorded data stream can be edited in terms of SOBU units by the user. As shown in FIG. 5, when deletion request for one SOBU 401 from among a recorded data stream is issued, the management information of the SOBU is deleted; therefore, the information about misalignment—SOBU_S_PKT_POS information of the deleted SOBU—is removed.

In the case of deleting the SOBU 401, it is necessary to physically remove the data 411a, 412a belonging to packet groups 411, 412, parts of which are included in the SOBU; for example, padding with null data is necessary. Since the head data of an SOBU always starts with I-picture and SOBU_S_PKT_POS information does not exist due to the deletion of the corresponding SOBU 401, when the packet group 411, the end of which is included in the deleted SOBU 401, is decoded, I-picture data 411a which has been made unnecessary due to the deletion may get fed into decoder. When done in this way, a serious problem may be caused in subsequent decoding. Since recording/reading operations in HD-DVD are carried out in terms of packet group units, in order to remove unnecessary data 411a, 412a which have been made unnecessary due to the deletion, reading-modifying-recording procedures must be carried out for respective packet groups 411, 412, parts of which are included in the deleted SOBU 401. However, these operations increase burden to a HD-DVD recording/playback apparatus compared with the case of modifying only navigation information during edition.

Accordingly, in the present invention, when unnecessary data occur due to deletion of an arbitrary SOBU or a number of sequential SOBUs, instead of carrying out operations of physically deleting the data, instructions for this situation are recorded in the management information so that unnecessary remaining data should not be fed into the decoder.

Figure 6:
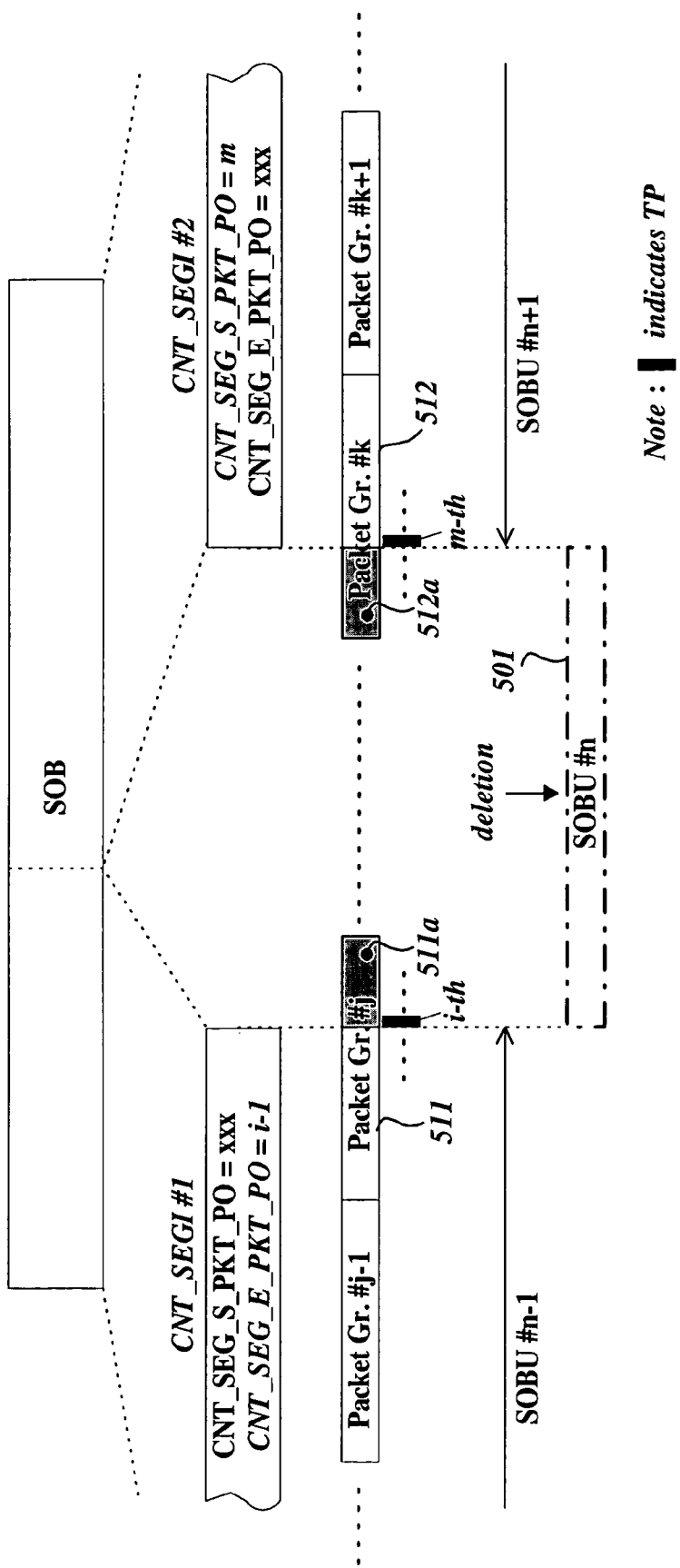
FIG. 6 illustrates a method for excluding unnecessary remaining data by utilizing continuous segment information allocated to each of continuously recorded streams according to one embodiment of the present invention.

In one embodiment of the present invention, as shown in FIG. 6, by assigning continuous segment information (CNT_SEGI) to a recorded data stream (SOB), when the recorded stream is split into two parts due to the deletion of one or more than one sequential SOBU, continuous segment information is newly generated and assigned to each part; thus, the two continuous record streams can respectively have continuous segment information. In other words, two pieces of continuous segment information (CNT_SEGI #1, #2) are associated with a single SOB. In continuous segment information (CNT_ SEGI), the number of packet groups belonging to the segment can be recorded. And individual continuous segment information has a field (CNT_SEG_E_PKT_PO) recording the number of the last TP belonging to the last packet group of the corresponding segment, which ranges from 0 to 169 and a field (CNT_SEG_S_PKT_PO) recording the number of a start TP belonging to the head packet group of the segment.

From the example of FIG. 6, by deleting SOBU 501, the value of SOBU_S_PKT_POS which was originally recorded in the management information of the deleted SOBU 501 (when multiple sequential SOBUs are deleted, the management information corresponds to that of the head SOBU from among the deleted SOBUs) is subtracted by 1 and recorded in the CNT_SEG_E_PKT_PO field of continuous segment information (CNT_SEGI #1) (The TP (TP #i–1) which precedes the head TP (TP #i) belonging to the deleted SOBU 501 by one becomes the last TP of the preceding continuous segment); the value (which is denoted by 'xxx') of SOB_E_PKT_POS recorded in SOB information is copied in the CNT_SEG_E_PKT_PO field of a newly generated continuous segment information (CNT_SEGI #2). Also, in the CNT_SEG_S_PKT_PO field of the newly generated continuous segment information (CNT_SEGI #2), SOBU_S_PKT_POS (the value recorded here becomes the number of the start TP of the split succeeding continuous segment) recorded in the management information of the SOBU (SOBU #n+1) next to the deleted SOBU 501 is copied and recorded.

According to the aforementioned recording procedure, since the information for excluding unnecessary remaining data due to the deletion of an arbitrary SOBU is maintained in continuous segment information (CNT_SEGI), by referring to the information (CNT_SEG_E_PKI_PO, CNT_SEG_S_PKT_PO) during playback, data deleted from packet groups are not fed into the decoder.

Figure 7:
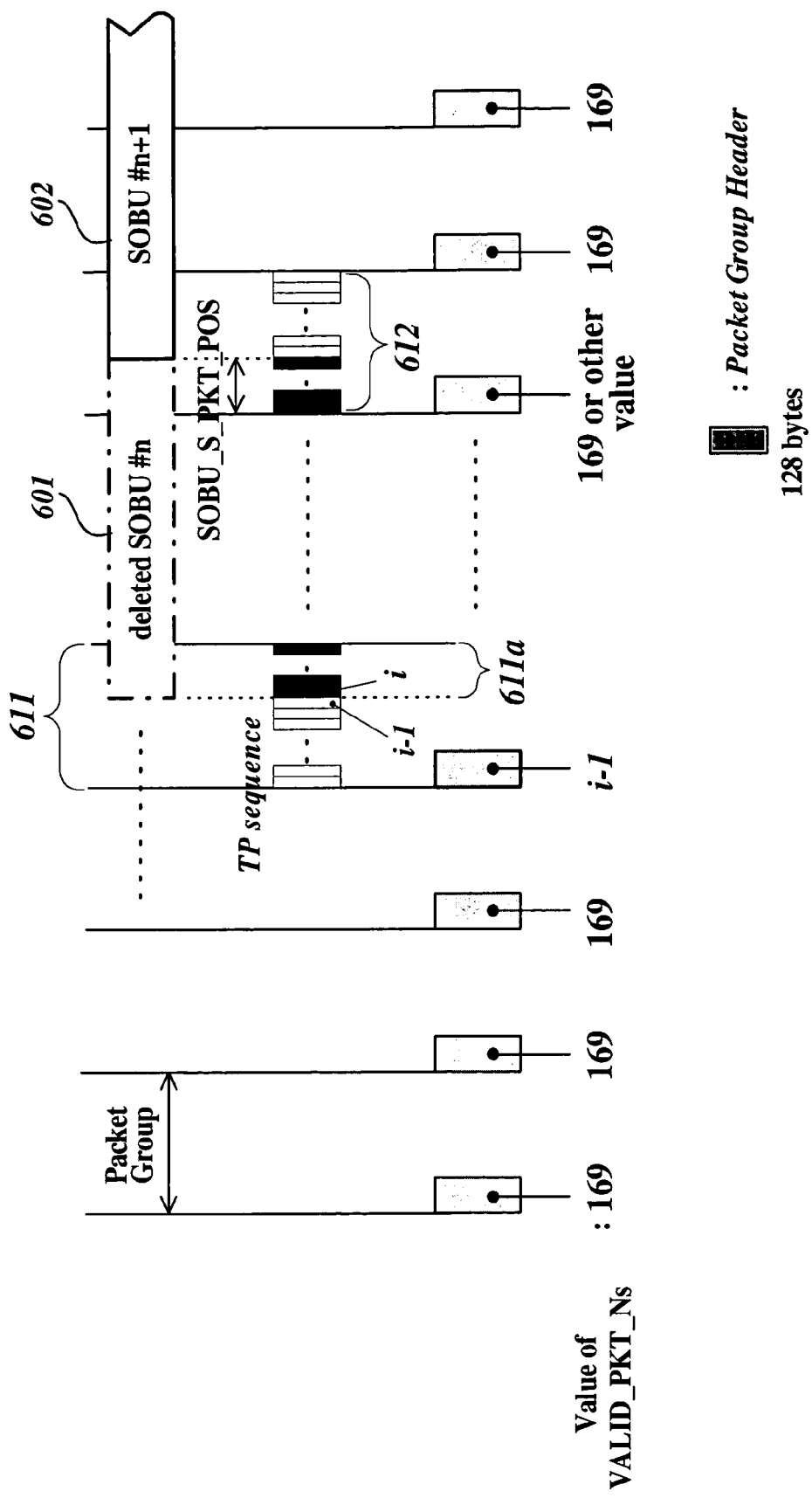
FIG. 7 illustrates a method for excluding unnecessary remaining data by utilizing header information of each packet group according to another embodiment of the present invention.

In another embodiment of the present invention, a value for excluding TP having unnecessary data due to the deletion of an arbitrary SOBU is recorded in the header of the corresponding packet group. As shown in FIG. 7, the number corresponding to the last TP of a packet group having valid data is recorded in the header of the packet group 611, which has now become to have unnecessary data 611*a* due to the deletion of an arbitrary SOBU 601. If TPs belonging to the deleted SOBU 601 are those ranging from i-th TP of the packet group 611, the number of the last TP having valid data to be recorded in the packet group 611 header becomes i–1; this value is recorded in the field of VALID_PKT_Ns within general information of packet group header having the structure as shown in FIG. 8.

The structure of FIG. 8 includes the type of a packet group (PKT_GRP_TYPE), version of the packet group (VERSION), status of the packet group (PKT_GRP_SS), and extended bytes of PATS of the first packet (FIRST_PATS_EXT); but, since these fields do not have direct relevancy to the present invention, descriptions thereof are omitted.

On the one hand, instead of the number of the last TP, the number of valid packets can be recorded. Since a packet number typically starts from 0, in the case of recording the number of valid packets, a value larger by one than the case of recording the number of the last valid packet is recorded.

As shown in FIG. 7, a value of 169 (or 170 when the number of packets is recorded) is recorded in VALID_PCK_Ns field located in the header of each packet group which does not include the data of the deleted SOBU 601.

Therefore, at the time of playback, by feeding up to the TP designated by the value of VALID_PKT_Ns located in the header of each packet group, a problem caused by decoding payload data of TPs having unnecessary data due to the deletion may be avoided.

On the other hand, as shown in FIG. 7, owing to the deletion of an arbitrary SOBU 601, in addition to the packet group 611 including unnecessary remaining data at the rear, a packet group 612 including unnecessary data at the head is also generated; information for skipping packets including unnecessary remaining data in the head of the packet group 612 is not recorded in the packet group header. Instead, since a value designated for skipping packets including unnecessary remaining data is recorded in the field of SOBU_S_PKT_POS within the VOBU entry of the SOBU 602 next to the deleted SOBU 601, the value is referred to at the time of playback.

Figure 9:
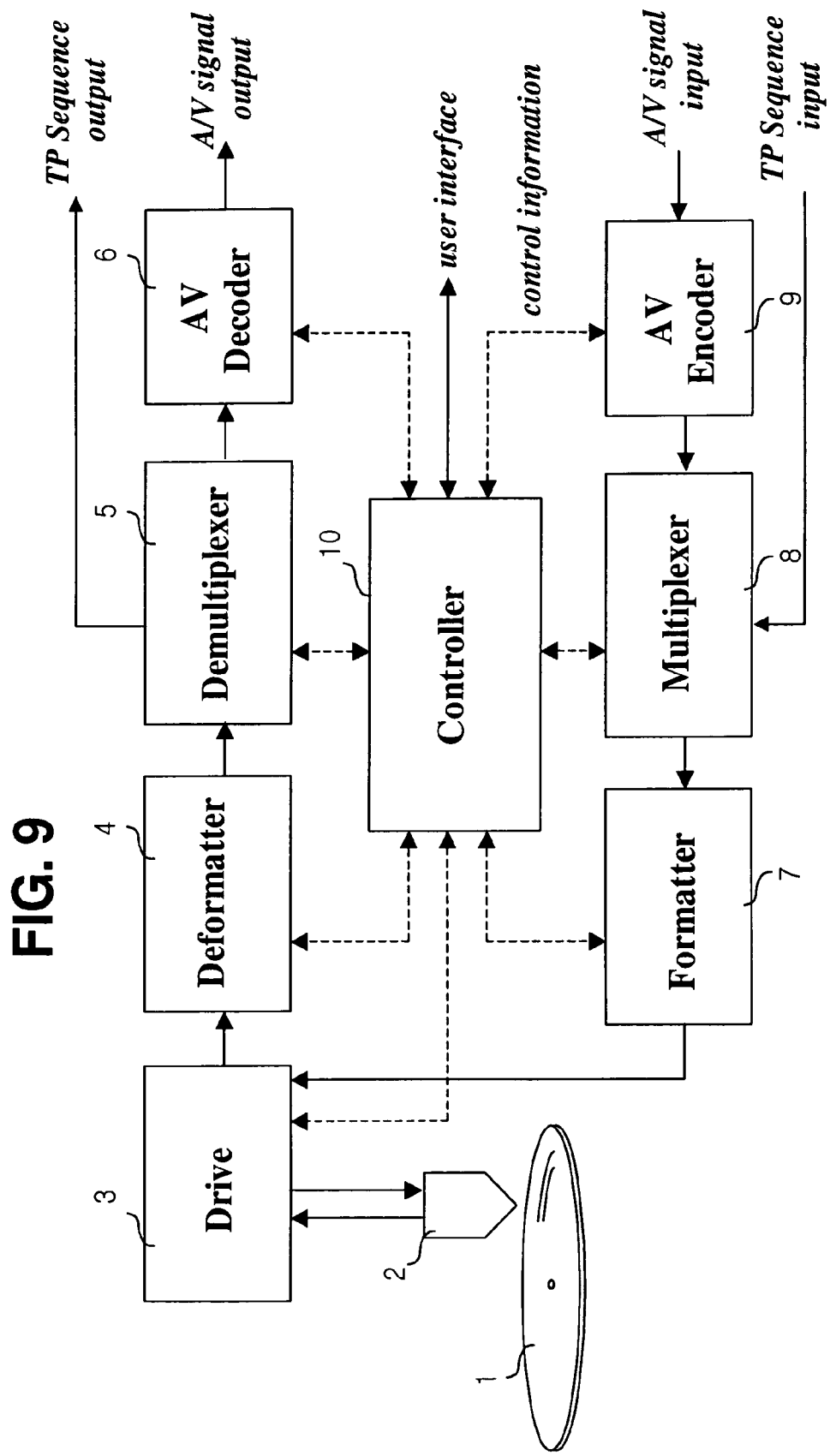
FIG. 9 illustrates the structure of an optical disc recording and reproducing apparatus according to the present invention.

FIG. 9 illustrates the structure of an optical disc recording and reproducing apparatus according to one embodiment of the present invention. A/V encoder 9 receives audio/video signals, encodes them, for example, according to MPEG 4 standard, and feeds encoded output to a multiplexer 8 along with coding information and stream property information. The multiplexer 8, for example, in order to make the encoded audio/video data in the form of a TP sequence (or transport stream), multiplexes them based on the input coding information and stream property information. Also, when a TP sequence is directly provided, the multiplexer 8 demuxes the data in each payload and analyzes header information of upper levels such as PES, Picture and GOP level. Formatter 7 organizes transport packets fed from the multiplexer 8 according to the audio/video recording format of an optical disc, for example, in accordance with packet groups (recording blocks). At this time, for the purpose of error correction, operations for assigning CRC code and data alignment can be applied. As shown in FIG. 9, operations of the A/V encoder 9, the multiplexer 8, and the formatter 7 are controlled by a controller 10. When the controller 10 receives a recording command from the user, it issues control information necessary for the A/V encoder 9, the multiplexer 8, and the formatter 7; and also controls a drive 3 to record the output of the formatter 7 on an optical disc such as HD-DVD in the form as shown in FIG. 1 or FIG. 2. In other words, the controller 10 makes the input TP sequence recorded by multiple recording blocks (packet groups) while dividing the input TP sequence by navigation units (when video signal is input, it is first converted into a TP sequence).

Also, the controller 10 generates navigation data for managing playback of audio/video data being recorded on an optical disc. For example, based on the information about encoded picture provided by the encoder 9 and multiplexer 8 when analog A/V is recorded and based on the information analyzed by the multiplexer 8 when transport streams are recorded, the controller 10 generates navigation information as shown in FIG. 3 and FIG. 4 and then controls the driver 3, thus making the analog A/V or transport streams recorded in the navigation data recording area of HD-DVD 1 loaded through an optical pickup 2.

In particular, the controller 10 receives information about GOP of encoded pictures and picture level from the encoder 9 and based thereupon, configures SOBU, a navigation unit, as shown in FIG. 2. As for an input digital stream, the controller 10 identifies the start position of GOP from the information analyzed and provided by the multiplexer 8, thus configuring SOBU. In other words, information for a single navigation unit is generated. At this time, the controller 10 composes one or multiple GOPs into a single SOBU in order for the presentation time of one or continuous GOPs to be from 0.4 to 1 second long.

According to one embodiment of the present invention, continuous segment information (CNT_SEGI) is created for a continuously recorded stream and recorded in a navigation data area. In the fields of CNT_SEG_E_PKT_PO and CNT_SEG_S_PKT_PO of firstly created continuous segment information (CNT_SEGI), recorded are the same values of SOB_S_PKT_POS and SOB_E_PKT_POS, which are recorded in the management information about the unit (SOB) of the continuously recorded stream.

After the recording process as stated above, when a deletion request against an arbitrary SOBU (or a continuous SOBU group) is issued from the user, SOBU entry for the corresponding SOBU is deleted from the time map; in the case of an embodiment where continuous segment information is created for the management of a continuously recorded stream, the controller 10 allocates continuous segment information before and after the deleted SOBU. That is to say, as shown in FIG. 6, CNT_SEG_E_PKT_PO value of firstly created continuous segment information (CNT_SEGI #1) contains the last TP number of the corresponding segment excluding a unnecessary part 511a due to the deleted SOBU, namely, (i−1); CNT_SEG_S_PKT_PO value of newly created continuous segment information (CNT_SEGI #2) contains the number of a start TP of the corresponding segment excluding a unnecessary part 512a due to the deleted SOBU, namely, m. Operations as above are completed by modifying navigation data loaded into memory (not shown) as described above and recording into the navigation data recording area of an optical disc 1 such as HD-DVD which was loaded by the drive 3.

In one embodiment wherein the information of packet group header is used, as shown in FIG. 7, the controller 10 modifies the VALID_PKT_NS value of the header of the packet group 611 which includes the data of the deleted SOBU at the rear. According to circumstances, the VALID_PKT_Ns value of the header of the packet group 612, which includes remaining data of the deleted SOBU at the head, can be updated to denote the number of valid packets only.

During playback, the controller 10 controls the drive 3 to reproduce data structure recorded or edited as above. For playback, navigation data is first read out and loaded into memory (not shown). Using the loaded information and user input received from user interface (operation buttons of a recording and playback apparatus or remote control related with the apparatus), the controller 10 controls the drive 3 to reproduce recording blocks (packet groups) from the optical disc 1. For example, the user input can designate a recorded program for playback (which is managed by navigation information as a single SOB). Such user input can be designated by a menu based on GUI (Graphical User Interface) pre-programmed in the controller 10. By using the user input and the loaded navigation information, the controller 10 fixes the designated program and controls the playback thereof.

Deformatter 4 receives a data stream reproduced by the drive 3, configures the data stream by recording block (packet group) units, distinguishes the header and 170 TPs and provides header information to the controller 10. Demultiplexer 5 inversely multiplexes the TPs into encoded video/audio data. If digital stream transmit mode is set by the controller 10, input TP sequence is directly transmitted through a digital connection port, for example, IEEE1394. A/V decoder 6 decodes input encoded video/audio data and converts them to the original video/audio signals. During playback, operations of the deformatter 4, the multiplexer 5, and the A/V decoder 6 are controlled by the controller 10.

On the one hand, during playback or searching, the remaining data which belonged to the deleted SOBU, with reference to the CNT_SEG_E_PKT_PO (and CNT_SEG_S_PKT_PO) value of continuous segment information included in the navigation data loaded into memory, or with reference to the VALID_PKT_Ns value of packet group header information configured in the deformatter 4, are excluded and are not fed from the deformatter 4 to the demultiplexer 5.

Although FIG. 9 illustrates a recording and playback apparatus, a dedicated recording apparatus or a dedicated playback apparatus providing recording or playback operation only by using part of structuring elements of FIG. 9 is equally applicable.

The present invention described with limited embodiments as above, by recording information for excluding unnecessary remaining data due to deletion, removes possibility for such remaining data to raise a problem during decoding.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

What is claimed is:

1. A method for editing data stream recorded on multiple recording blocks of a recording medium, comprising:

recording first information on the recording medium when an arbitrary navigation unit is deleted from the data stream that is partitioned by navigation units, the first information being used for distinguishing valid data from remaining data in a recording block including both the remaining data belonging to the deleted navigation unit and the valid data belonging to a navigation unit right before the deleted navigation unit, wherein the first information indicates a last transport packet having the valid data within the recording block.

2. The method of claim 1, further comprising:

recording second information on the recording medium when said arbitrary navigation unit is deleted, the second information being used for distinguishing valid data from the remaining data in a recording block including both the remaining data belonging to the deleted navigation unit and valid data belonging to a navigation unit right after the deleted navigation unit.

3. The method of claim 1, wherein the first information is recorded in an area for continuous segment information which is management information assigned to a continuously recorded data stream.

4. The method of claim 3, wherein the continuous segment information includes information about start and end positions of a continuously recorded data stream associated with the continuous segment information.

5. The method of claim 3, wherein the continuous segment information includes information about number of recording blocks on which a data stream associated with the continuous segment information is continuously recorded.

6. The method of claim 3, further comprising:

allocating a continuous segment information area in a part of the data stream, which has been separated due to the deletion of said arbitrary navigation unit, and recording additional information in the allocated area, when said arbitrary navigation unit is deleted.

7. The method of claim 1, wherein the first information is recorded in a header of the recording block.

8. An apparatus for recording and reproducing video data and management information thereof to/from a recording medium, comprising:

a recording/reproducing unit configured to record signals on the recording medium and/or read out recorded signals;

a formatter configured to format input data including video data to suitable forms for recording blocks, the recording blocks having a recording format of the recording medium, the formatted data being applied to the recording/reproducing unit, and data of recording blocks from the recording/reproducing unit being stored in a storage device; and a controller configured to control the recording/reproducing unit to record the video data on multiple recording blocks while partitioning into navigation units, and to create first information on the recording medium when an arbitrary navigation unit is deleted from the recorded video data, and the controller configured to control the recording/reproducing unit to record the first information on the recording medium, the first information being used for distinguishing valid data from remaining data in a recording block including both the remaining data belonging to the deleted navigation unit and the valid data belonging to a navigation unit right before the deleted navigation unit, wherein the first information indicates a last transport packet having the valid data within the recording block.

9. The apparatus of claim 8, wherein the controller is further configured to conduct operations of creating second information on the recording medium when said arbitrary navigation unit is deleted, and control the recording/reproducing unit to record the second information, the second information being used for distinguishing valid data from the remaining data in a recording block including both the remaining data belonging to the deleted navigation unit and valid data belonging to a navigation unit right after the deleted navigation unit.

10. The apparatus of claim 8, wherein the controller is configured to control the recording/reproducing unit to record the first information within an area for continuous segment information which is management information assigned to a continuously recorded data stream.

11. The apparatus of claim 8, wherein the controller is configured to control the recording/reproducing unit to record the first information in a header of said arbitrary recording block.

12. The apparatus of claim 8, wherein, when data stored in the storing device includes data excluded by the first information, the controller is configured not to apply the excluded data to a video decoder.

13. The apparatus of claim 12, wherein the excluded data is at least one transport packet, within a recording block, whose sequence number follows a number indicated by the first information.

14. The apparatus of claim 12, wherein the excluded data is at least one transport packet, within a recording block, whose sequence number precedes a number indicated by the first information.

* * * * *